(No Model.)
F. S. POSTAL.
CANT HOOK.
No. 439,553. Patented Oct. 28, 1890.
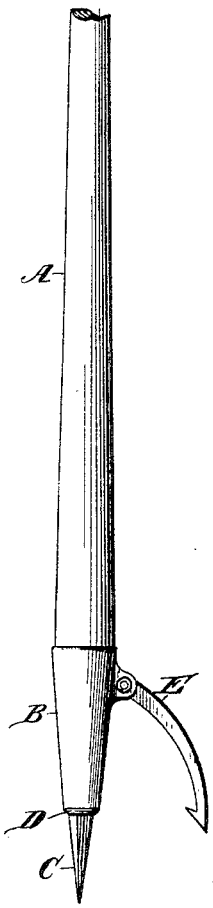
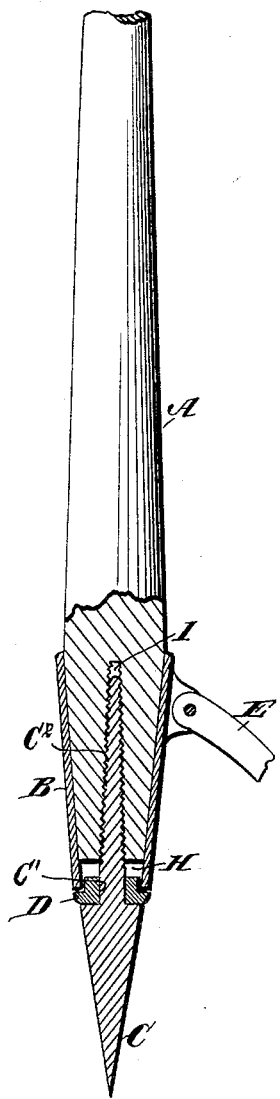
Witnesses.
Robt Everett
J. A. Rutherford
Inventor:
Frank S. Postal,
By Edward Taggant, Atty.

UNITED STATES PATENT OFFICE.

FRANK S. POSTAL, OF EVART, MICHIGAN, ASSIGNOR TO THE CHAMPION TOOL AND HANDLE WORKS, OF SAME PLACE.

CANT-HOOK.

SPECIFICATION forming part of Letters Patent No. 439,553, dated October 28, 1890.

Application filed May 21, 1890. Serial No. 352,584. (No model.)

*To all whom it may concern:*

Be it known that I, FRANK S. POSTAL, a citizen of the United States, residing at the village of Evart, in the county of Osceola and State of Michigan, have invented certain new and useful Improvements in Cant-Hooks, of which the following is a specification.

My invention relates to what is commonly known as a "peavey cant-hook," the same being a cant-hook provided with a sharp metallic point, used by lumbermen in handling logs, the cant-hook provided with a wooden handle, a hooked arm attached to the socket, and a metallic point terminating the lower end of the implement.

The objects of my invention are, first, to provide a substantial and durable attachment of the socket to the handle; second, to adjust the metallic point or spear so that in use it will have the least strain upon the wood, and, third, to use the shank of the spear or pointed metallic portion for the purpose of tightening the handle in the socket when these parts become loosened from continued use. These objects I accomplish by means of the mechanism illustrated in the accompanying drawings, in which—

Figure 1 is a side elevation of a peavey cant-hook constructed in accordance with my invention; and Fig. 2 is also a side elevation having the socket and wooden part inclosed shown in vertical section, in order to show the internal structure of this part of my invention.

Similar letters refer to similar parts throughout the several views.

A represents the wooden handle.

B represents the metallic socket or handle.

E represents an arm provided with a hook similar to arms used in ordinary cant-hooks.

C represents the metallic point or spear, which is provided with a shank comprising a smooth cylindrical portion C' and a screw-threaded portion C², adapted to engage with the wooden handle.

D represents a metallic washer.

H represents an open space left between the washer and the wooden handle for the purpose hereinafter specified.

I represents that portion of the wooden handle which receives the shank of the spear, and which is preferably made to extend a short distance beyond the end of the shank for the purpose hereinafter specified.

In peavey cant-hooks as heretofore made the spear has been constructed with a smooth shank, usually rectangular in cross-section, which has been fastened into the wooden handle by driving the same in with great force. In constructing the handle for the reception of the spear-head a hole is bored of sufficient size to allow the spear-head to be screwed into the handle. If the handle has a screw-thread provided within it, such screw-thread should fit closely to the thread of the shank of the spear; but ordinarily the hole for the reception of the shank is made a little smaller than the shank of the spear, and the spear is applied in the ordinary manner of forcing a screw into material softer than the screw.

The washer D is provided with a flange around its outer edge, which, with the body, forms a shoulder. The inner portion of the washer fits in closely between the rim of the lower end of the socket, as shown in Fig. 2; but, if found desirable, the washer D may be made integral with the socket B. A space, however, as H, should be left, for the reason that ordinarily after the application of the socket to the wooden handle the tools are exposed to the weather, are often used in the water, and the wetting and drying of the wood causes it to shrink, allowing the socket to drop from the handle. In a cant-hook constructed in accordance with my invention whenever the wood shall have shrunk all that is necessary to be done to tighten it up is with the ordinary monkey-wrench to screw down the spear, which is provided with a shoulder resting against the washer D. This operation not only tightens the stock upon the handle, which handle is slightly tapering at the lower end, thereby causing the socket to bind upon the handle and hold itself securely thereby, but the shoulder upon the spear itself securely holds the socket in position. It will also be observed that the handle A and socket B are formed without shoulders, and thus permit the socket to be moved upon the handle to tighten it thereon whenever shrinkage of the handle may take place from exposure to the weather or other causes. The tapering shoulderless extremity of the handle, together with the tapering shoulderless socket, thus affords a reliable means for securing and adjusting the metallic point or spear in such a manner that it will exert the least strain on the wood.

The spear-head is used for the purpose of separating logs in log-jams and other places, and is subject to a severe strain. In the form shown in my invention the strain is received upon the washer, and thereby upon the lower end of the socket B, which prevents the shank from working loose within the handle and holds it at all times in a secure position.

Having thus described my invention, what I claim to have invented, and desire to secure by Letters Patent, is—

1. A cant-hook consisting of the handle A, having a tapering shoulderless lower extremity, a tapering and shoulderless metallic socket B, fitted to the tapered extremity of the handle and projecting beyond the same, a washer D, arranged at the lower and smaller end of the socket, and the spear or metallic point C, having a shoulder resting against the washer and provided with a screw-threaded shank $C^2$, engaging the tapering extremity of the handle and serving by the rotation of the spear or metallic point to draw the tapering end of the handle tightly into the metallic socket, substantially as described.

2. A cant-hook consisting of a handle A, having a tapering and shoulderless lower extremity, a tapering and shoulderless metallic socket B, fitted to the tapering extremity of the handle, a washer D, engaging the lower and smaller end of the metallic socket and provided with a smooth orifice extended therethrough, and the spear or metallic point C, provided with a shank having a smooth cylindrical portion $C'$, adapted to freely turn in the smooth orifice of the washer, and a screw-thread $C^2$ above the smooth cylindrical portion engaging the tapering extremity of the handle to draw the handle into the metallic socket by rotating the spear or metallic point in the washer, substantially as described.

In witness whereof I have hereunto set my hand and seal in the presence of two witnesses.

FRANK S. POSTAL. [L. S.]

Witnesses:
JOSEPH SAYLES,
WM. E. DAVIS.